(12) United States Patent
Sheynblat

(10) Patent No.: US 7,660,658 B2
(45) Date of Patent: Feb. 9, 2010

(54) APPARATUS AND METHODS FOR SPEED MANAGEMENT AND CONTROL

(75) Inventor: Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 548 days.

(21) Appl. No.: 11/361,221

(22) Filed: Feb. 23, 2006

(65) Prior Publication Data

US 2007/0198160 A1 Aug. 23, 2007

(51) Int. Cl.
*B60Q 1/00* (2006.01)
*G08G 1/01* (2006.01)
*G06F 19/00* (2006.01)

(52) U.S. Cl. .................. 701/93; 701/117; 701/213; 340/438; 455/456.1

(58) Field of Classification Search ............... 701/93, 701/117, 201, 211, 213, 301; 340/936, 905, 340/901, 438; 455/456.1
See application file for complete search history.

(56) References Cited

U.S. PATENT DOCUMENTS

| | | | |
|---|---|---|---|
| 5,485,161 A * | 1/1996 | Vaughn | 342/357.13 |
| 6,008,740 A | 12/1999 | Hopkins | |
| 6,163,277 A * | 12/2000 | Gehlot | 340/905 |
| 6,166,658 A | 12/2000 | Testa | |
| 6,246,948 B1 * | 6/2001 | Thakker | 701/93 |
| 6,462,675 B1 * | 10/2002 | Humphrey et al. | 340/905 |
| 6,496,709 B2 * | 12/2002 | Murray | 455/569.1 |
| 6,515,596 B2 * | 2/2003 | Awada | 340/905 |
| 6,675,085 B2 * | 1/2004 | Straub | 701/93 |
| 6,728,605 B2 * | 4/2004 | Lash et al. | 701/1 |
| 6,748,322 B1 * | 6/2004 | Fernandez | 701/213 |
| 6,895,324 B2 * | 5/2005 | Straub | 701/93 |
| 7,081,833 B2 * | 7/2006 | Jo | 340/936 |
| 7,397,365 B2 * | 7/2008 | Wang | 340/539.13 |
| 2002/0126023 A1 | 9/2002 | Awada | |
| 2005/0264404 A1 * | 12/2005 | Franczyk et al. | 340/441 |
| 2007/0001830 A1 * | 1/2007 | Dagci et al. | 340/438 |

FOREIGN PATENT DOCUMENTS

GB 2324605 10/1998

* cited by examiner

*Primary Examiner*—Tan Q Nguyen
(74) *Attorney, Agent, or Firm*—Raphael Freiwirth

(57) ABSTRACT

Apparatus, methods and computer readable media for speed management and control, including logic executable to determine a present geographic position of a wireless device, logic executable to determine a speed limit corresponding to the present geographic position, and logic executable to selectively generate an alert based upon the speed limit.

29 Claims, 5 Drawing Sheets

APPARATUS AND METHODS FOR SPEED MANAGEMENT AND CONTROL

FIELD OF THE INVENTION

The disclosed embodiments relate to wireless devices and wireless communication networks, and more particularly, to apparatus and methods for speed management and speed control of a vehicle through a wireless device on a wireless network.

BACKGROUND

The driver of a vehicle should be aware of the speed limit of the road upon which they are driving. Unfortunately, currently the only way for a driver to know the speed limit of a road is to observe posted speed limit signs, or to know the rules of a given city, area or type of road as to the speed limit when no signs are posted. Posted speed limit signs are problematic because such signs may only be located infrequently on any given stretch of road. As such, a driver turning onto the road may not be notified of the speed limit in a timely manner. Another disadvantage of such posted speed limit signs is that they are often obstructed from view by trees, shrubs and other signs. Further, even if not obstructed, such speed limit signs may be difficult to see among the myriad of signs and advertisements typically found in urban and suburban areas. Additionally, if a driver is new to a particular stretch of road, or is trying to find a location on the road, such posted speed limit signs may be outside of the driver's focus of attention and may be easily missed. Thus, posted speed limit signs often provide less than adequate notice of the speed limit for that road to a driver of a vehicle.

Alternately, many drivers are not familiar with local speed limit rules, such as on city streets where speed limit signs are often not posted. For example, these areas rely on postings located at the perimeter of the area, such as a sign reading "city speed limit of 25 mph unless otherwise posted," and if the driver does not notice these signs prior to entering the area, they may never again be notified of the speed limit within the area. Thus, many drivers lack knowledge of the rules of a given city, area or type of road as to the speed limit.

There are systems, such as cruise control systems, that help a driver to maintain a vehicle at a desired speed limit value set by the driver. The disadvantage of these systems, however, is that the desired speed limit value will not change until manually altered or cancelled. These cruise control systems do not include any mechanism to notify the driver of a speed limit of a road, or to automatically adjust the desired speed limit value based upon a change in the speed limit of the road.

Therefore, improved apparatus and methods are desired to aid a driver in managing and controlling the speed of a vehicle in relation to a speed limit for the road or transit route upon which they are traveling.

BRIEF SUMMARY

To address one or more of the drawbacks of the prior art, the disclosed embodiments provide apparatus and methods for speed management and control.

In one embodiment, a method of speed management and control comprises receiving a present geographic position of a wireless device, determining a speed limit corresponding to the present geographic position, and selectively generating an alert based upon the speed limit.

In another embodiment, a method of speed management and control comprises determining a present geographic position of a wireless device and referencing a database on the wireless device having a plurality of geographic location data associated with a plurality of speed limit data. The method further includes matching the present geographic position with one of the plurality of geographic location data, and then identifying a speed limit as the one of the plurality of speed limit data corresponding to the matched one of the plurality of geographic location data. Additionally, the method includes selectively generating an alert on the wireless device based upon the speed limit. A further embodiment includes a computer readable medium executable by a processor to perform the above-stated actions.

In yet another embodiment, an apparatus for speed management and control comprises a determination means for determining a present geographic position of a wireless device. The apparatus further includes a referencing means for referencing a database on the wireless device having a plurality of geographic location data associated with a plurality of speed limit data. Also, the apparatus includes a matching means for matching the present geographic location with one of the plurality of geographic location data. Further, the apparatus includes an identification means for identifying a speed limit as the one of the plurality of speed limit data corresponding to the matched one of the plurality of geographic location data. Additionally, the apparatus includes a first generating means for selectively generating an alert on the wireless device based upon the speed limit, and a second generating means for generating a speed control signal based on the speed limit, where the speed control signal is operable to change a speed of movement of the wireless device on a transit route.

In still another embodiment, a wireless device comprises a computer platform and a speed management module executable by the computer platform. The speed management module being operable to receive a geographic position associated with the wireless device and further operable to determine a speed limit corresponding to the geographic position. Additionally, the speed management module being further operable to generate an alert based upon the speed limit.

Additional aspects and advantages of the disclosed embodiments are set forth in part in the description which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

The disclosed embodiments include apparatus, methods and computer readable media for the management and control of a speed of movement associated with a wireless device. These apparatus and methods provide a wireless device with logic that enables the wireless device to automatically determine a speed limit of a transit route, such as a road, corresponding to the geographic position of the device. As such, the wireless device may generate an output to notify an end user of the speed limit, and may further generate speed control signals to automatically initiate a change in an actual speed associated with the wireless device, such as the speed of a vehicle carrying the wireless device.

Figure 1:
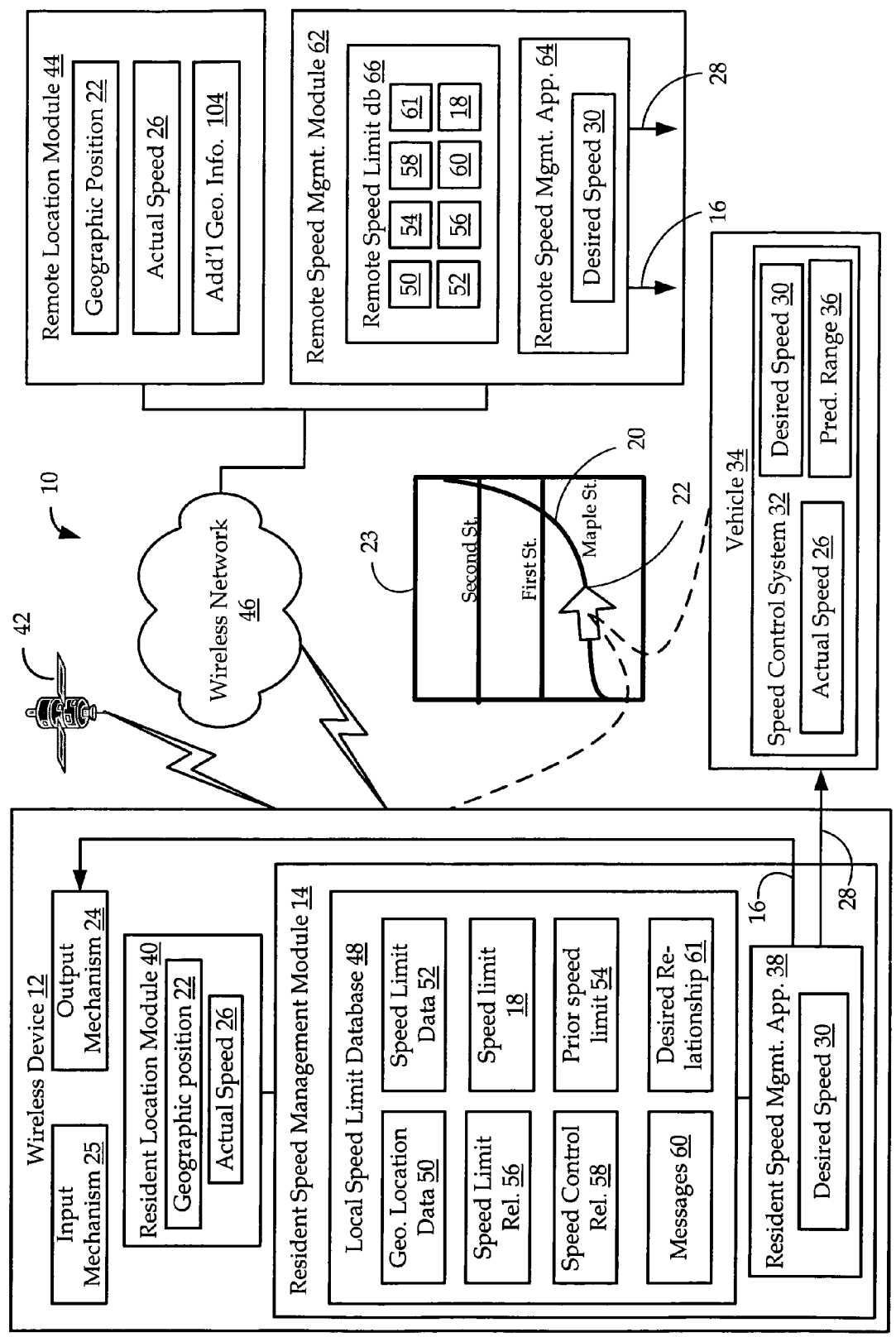
FIG. 1 is a representative diagram of one embodiment of a speed management and control system, including a wireless device associated with a vehicle and in communication with a geographic information system for determining a present geographic location and subsequently a corresponding speed limit.
Figure 2:
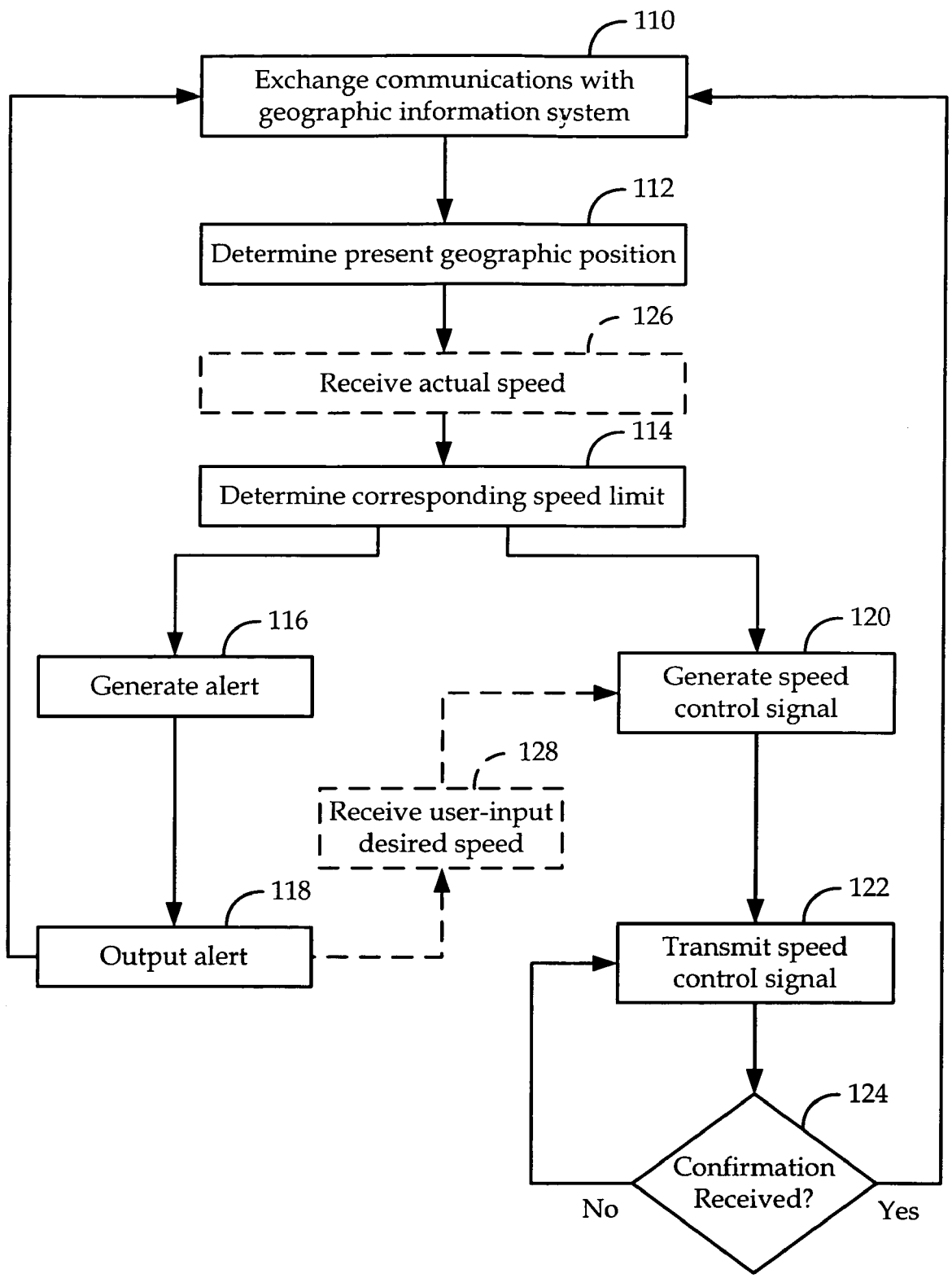
FIG. 2 is a flowchart of one embodiment of method of speed management and control operable on the wireless device of FIG. 1.
Figure 3:
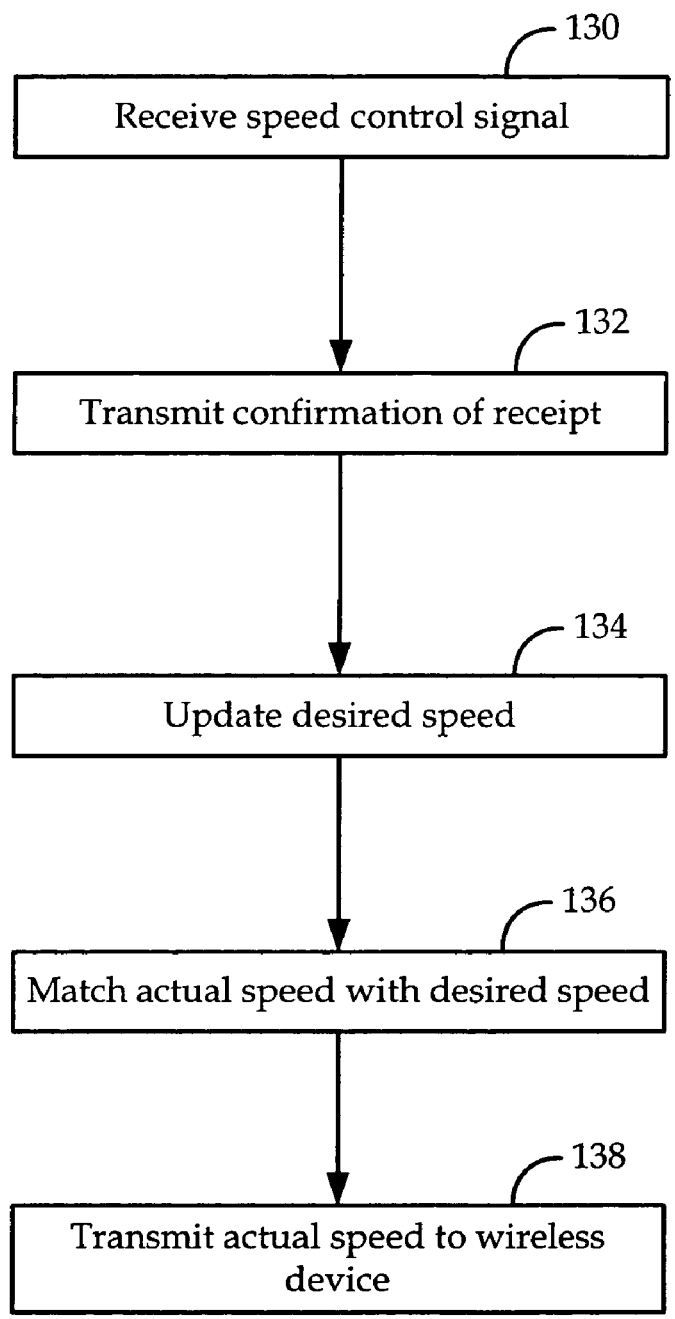
FIG. 3 is a flowchart of one embodiment of method of speed management and control operable on the vehicle of FIG. 1.

Referring to FIGS. 1-3, one embodiment of a speed management and control system 10 includes a wireless device 12 having a resident speed management module 14 that determines a current speed limit 18 for a transit route 20 associated with a present geographic position 22 of the wireless device. Resident speed management module 14 may then generate an alert 16 based on the current speed limit 18. For instance, alert 16 may be some type of user recognizable indicator associated with the current speed limit 18 generated by an output mechanism 24, such as a graphic representing the current speed limit 18 displayable on a display module of wireless device 12. Further, resident speed management module 14 may monitor and/or control an actual speed 26 associated with movement of wireless device 12 based on speed limit 18. For instance, resident speed management module 14 may generate a speed control signal 28, including a desired speed 30 that is based on speed limit 18, for use by a speed control system 32 of a vehicle 34 associated with wireless device 12. For example, speed control system 32 receives desired speed 30 and operates to maintain actual speed 26 of vehicle 34 within a predetermined range 36 of desired speed 30. Thus, speed management and control system 10 includes a wireless device 12 having a resident speed management module 14 for determining and notifying a user of the current speed limit 18 based on the present geographic position 22 of the wireless device, and may additionally provide a speed control signal 28 to vehicle 34 associated with wireless device 12 to match actual speed 26 with desired speed 30.

In one embodiment, referring to FIG. 2, to determine speed limit 18 associated with transit route 20, resident speed management module 14 includes logic which executes to determine the present geographic position 22 of wireless device 12. For instance, such logic may include a resident speed management application 38 that executes to initiate operation of additional logic, such as a resident location module 40, to estimate the present geographic position 22 of wireless device 12. For example, resident location module 40 may include logic executable to wirelessly exchange communications with a geographic information system (Block 110), which includes location determination system such as an orbiting global positioning system 42 and/or a remote location module 44 situated across a wireless network 46. Resident location module 40 operates with these exchanged communications and data to determine the present geographic position 22 of wireless device 12 (Block 112). For example, resident location module 40 or the geographic information system typically determines the present geographic position 22 by performing triangulation calculations to estimate a position location based on the timing and/or distance associated with communications messages and data exchanged between wireless device 12 and a plurality of geographic information system stations, such as satellites and/or cellular base stations. Once the present geographic position 22 is determined, resident speed management application 38 executes to locally determine the corresponding current speed limit 18 (Block 114). For example, resident speed management application 38 executes to reference to a local speed limit database 48 that associates a plurality of geographic location data 50 with a plurality of speed limit data 52. Further, resident speed management application 38 executes to match present geographic position 22 with one of the plurality of geographic location data 50, and thereby finds the associated speed limit data 52 that defines current speed limit 18.

Upon determining the current speed limit 18, resident speed management application 38 may then execute to generate, transmit and/or present alert 16 (Blocks 116, 118). Alert 16 may be generated, transmitted and/or presented on either a continuous basis or a selective basis, for example, based on predetermined time intervals or predetermined events. Predetermined events may include, for example, a change in the speed limit, a condition where the current setting of the desired speed is outside of a predetermined range of the current speed limit, a condition where the existing actual speed is outside of a predetermined range of the current speed limit, and a condition of detecting a change in the current speed limit. For instance, in a speed limit monitoring mode, resident speed management application 38 may compare current speed limit 18 with a previously stored speed limit 54 associated with a previous geographic position of wireless device 12, and generate alert 16 if there is a difference between the two values that exceeds a predetermined speed limit relationship 56. Similarly, in a speed monitoring mode, resident speed management application 38 may execute to compare current speed limit 18 with desired speed 30 and/or actual speed 26, and generate alert 16 if there is a difference between the values that exceeds a predetermined speed control relationship 58. Additionally, as mentioned above, alert 16 may include an indication of current speed limit 18, an indication of a change in current speed limit as well as other associated predetermined messages 60. For example, predetermined messages 60 may include, but are not limited to: a warning that the speed limit has increased or decreased based on a comparison of current speed limit 18 and prior speed limit 54; an indication of actual speed 26; an indication of desired speed 30; a representation 23 (FIG. 1) of the geographical area and/or a transit route map of the present geographical position 22; a representation of a special road condition, such as: slippery when wet, icy, a downhill/decline and angle/degrees, uphill, recommendation to use lower gear, turning on the headlights, railroad-tracks ahead, narrow bridge; a warning of special zoning, such as: school zone, construction zone—any road sign can be in the database and can therefore be automatically accessed and displayed; a warning of a speed condition, such as: actual speed 26 being above speed limit 18; actual speed 26 being below speed limit 18; actual speed 26 being about equal to speed limit 18; actual speed 26 being within a predetermined range of speed limit 18; and actual speed 26 being outside of the predetermined range of the speed limit 18; etc. After outputting alert 16 (Block 118), the system may resume operation to determine the current geographic location and associated speed limit (Block 110).

The system can also anticipate an upcoming event/road condition based on current geographic location or current geographic location and current velocity (speed and heading) or alternatively based on current geographic location, current speed and geographic map. The system therefore can provide alerts 16 that include advance notifications of such upcoming events/road conditions.

Optionally, after determining speed limit 18 corresponding to the present geographic position, resident speed management module 14 may generate speed control signal 28 (Block 120). For example, resident speed management application 38 may execute to compare current speed limit 18 with previously-stored speed limit 54, and if they do not match, generate desired speed limit 30 based on speed limit 18. Desired speed limit 30 may be equal to speed limit 18, or desired speed limit 30 may have some predetermined desired relationship 61 to speed limit 18. For example, predetermined desired relationship 61 may be a selectable speed limit value above or below current speed limit 18. Further, resident speed management module 14 may transmit speed control signal 28, including desired speed 30, for receipt by vehicle 34 in order to control the speed of the vehicle (Block 122; FIG. 3, Block 130). Optionally, resident speed management module 14 may include logic to ensure that vehicle 34 has properly received speed control signal 28 (Block 124). For example, resident speed management application 38 may execute to check for receipt of a confirmation from vehicle 34 that speed control signal 28 has been received, and either retransmit speed control signal 28 (Block 122) if a receipt confirmation is not received in a predetermined time, or resume operation to determine the current speed limit based on the present geographic position (Block 110). Correspondingly, vehicle 34 includes logic to transmit a receipt confirmation to wireless device 12 to verify that speed control signal 28 was received (FIG. 3, Block 132). Alternatively, the resident speed management module 14 may include logic for determining the change in the actual speed in order to verify the response of the vehicle to the speed control signal 28 (i.e. the actual speed is decreasing from value v to value v-Δv in a time interval T as expected in response to the speed control signal).

Further, vehicle 34 includes logic, such as speed control system 32, to update a stored value of desired speed with the newly-received value of desired speed 30 (FIG. 3, Block 134). Further, speed control system 32 includes logic that operates to match actual speed 26 to desired speed 30 (FIG. 3, Block 136). For example, performing such a match may include monitoring logic that determines and compares actual speed 26 with desired speed 30, where adjustments to actual speed 26 are made until actual speed 26 equals desired speed 30, or until actual speed 26 is within predetermined range 36 of desired speed 30. Predetermined range 36 may be a range of speeds set by the manufacturer of speed control system 32, or which may be a range of speeds configurable by a user or by resident speed management module 14. For example, predetermined range 36 may be a range of speeds to ensure that the actual speed will be below the "maximum" and above the "minimum" desired speed, e.g. the user may not want to ever exceed 60 mph even though the current speed limit may be 65 mph. Optionally, speed control system 32 may include logic that transmits the detected actual speed 26 to wireless device 12 (FIG. 3, Block 138), where it may be stored and utilized in the operations of resident speed management module 14.

Additionally, resident speed management module 14 may include logic for determining actual speed 26 (Block 126). For example, resident speed management application 38 may include logic to calculate actual speed based on a change in geographic positions 22 over time. Alternatively, resident speed management application 38 may include logic to exchange communications with, and receive actual speed 26 from, vehicle 34 (see FIG. 3, Block 138). In yet a further option, resident speed management application 38 may include logic to exchange communications with, and receive actual speed 26 from, remote location module 44, which may include logic to calculate actual speed based on a change in geographic positions 22 over time or based on a direct speed reading from a GPS system. For example, typical GPS systems allow Doppler-based speed calculation, not necessarily relying on the change in the position, and such determinations can be done either in the resident module 14 or in remote module 64. As such, the logic of resident speed management module 14 may generate alert 16 (Block 116) and/or speed control signal (Block 120) based on actual speed 26.

Rather than having the system automatically generate speed control signal 28, resident speed management module 14 may receive a user input of desired speed 30 (Block 128), such as in response to the presentation of alert 16 on output mechanism 24 (Block 118). For example, a user of vehicle 34 and/or wireless device 12 may provide a desired speed input to an input mechanism 25 of wireless device 12. Input mechanism 25 includes, but is not limited to, a keyboard, a touchpad, a touch screen display, an audio input recognition mechanism, etc. As such, resident speed management module 14 includes logic to incorporate this manually-entered desired speed 30 into the generated speed control signal 28 (Block 120). In one example, desired speed input may represent a desired maximum speed.

Further, resident speed management module 14 may execute to exchange communications with vehicle 34 or with remote location module 44 across wireless network 46 to receive actual speed 26. For instance, speed control system 32 of vehicle 34 may monitor actual speed 26 and selectively forward its value to resident speed management module 14. The selective forwarding of actual speed 26 may be a setting determined by resident speed management module 14. For example, the selective forwarding of actual speed 26 by speed control system 32 may be continuous, or based on receipt of a request from resident speed management module 14, or based on a predetermined change in actual speed, or based on a predetermined deviation from desired speed 30, or other predetermined speed-related event. Alternatively, remote location module 44 may include logic executable to estimate actual speed 26 based upon a change in geographic position 22 over time. In another example, remote location module 44 may include logic executable to estimate actual speed 26 based upon instantaneous GPS measurement. In this case, remote location module 44 may operate to selectively transmit actual speed 26 across wireless network 46 to resident speed management application 38 to perform the operations described above. For example, in a speed monitoring mode, resident speed management application 38 may execute to compare current speed limit 18 with actual speed 26, and generate alert 16 if there is a difference between the values that exceeds predetermined speed control relationship 58.

Further, resident speed management module 14 may execute to exchange communications with resident location module 40 to receive actual speed 26. For example, GPS Doppler (pseudorange rate) measurements allow computation of vehicle velocity (speed and heading).

Figure 4:
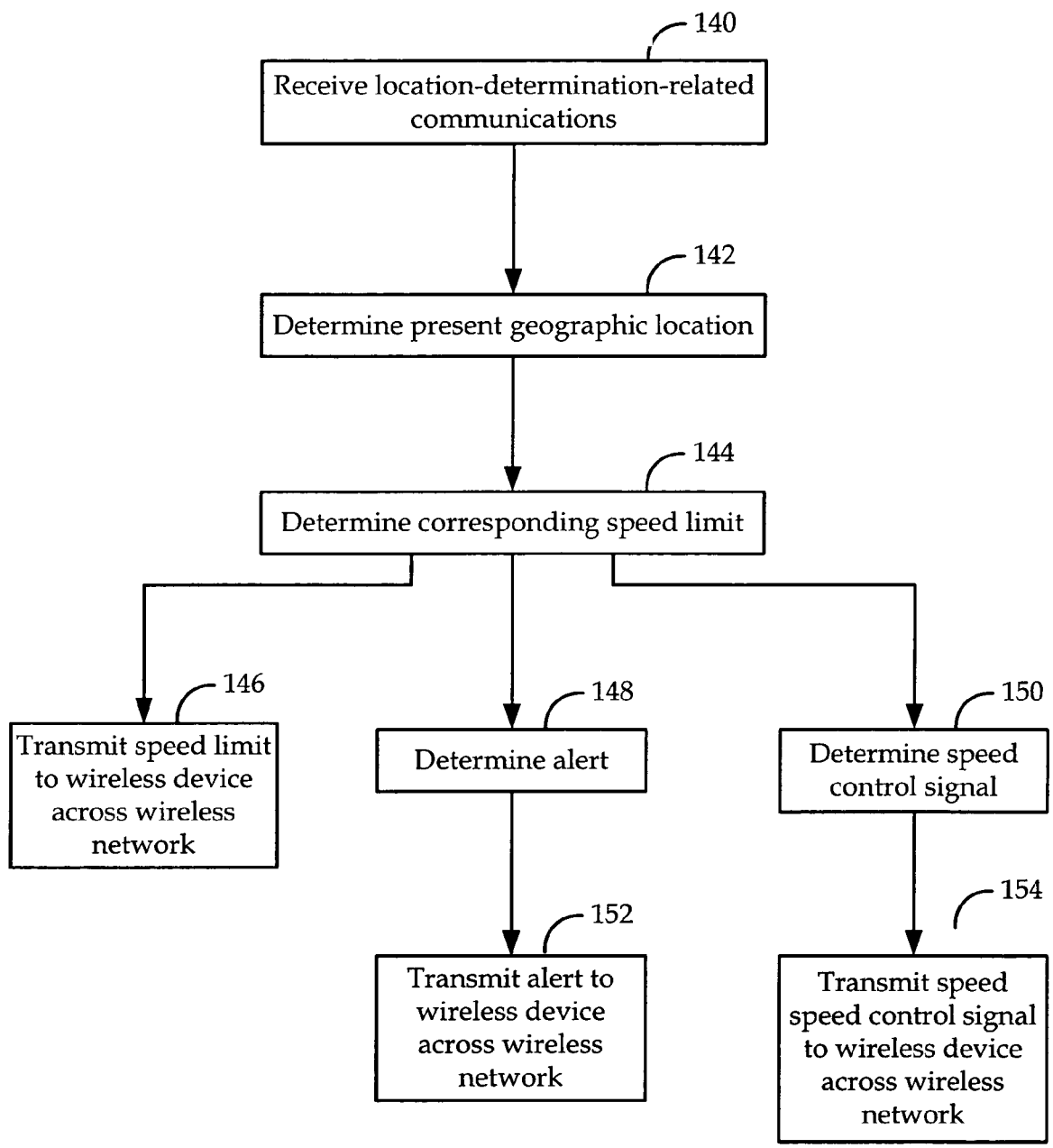
FIG. 4 is a flowchart of one embodiment of method of speed management and control operable on the modules of FIG. 1 located across the wireless network.

In another embodiment, referring to FIG. 4, instead of determining current speed limit 18 locally on wireless device 12, system 10 may be configured so that remote speed management module 62 determines current speed limit 18 based on the present geographic position 22. For example, remote speed management application 64 may include logic executable to receive the exchanged location-determination-related communications between wireless device 12 and remote location module 44 (Block 140). Further, remote speed management application 64 includes logic to determine present geographic position 22 based on the exchanged communications with wireless device 12 (Block 142). For example, remote speed management application 64 executes to generate the present geographic position 22 in a similar manner as described above with reference to resident speed management application 38. In this case, however, remote speed management application 64 operates by accessing a remote speed limit database 66, which may be essentially equivalent to local speed limit database 48. Alternatively, remote location module 44 may include similar logic and data to determine and transmit present geographic position 22 to remote speed management application 64. In yet another alternative, remote speed management application 64 may receive present geographic position 22 from wireless device 12. Once present geographic position 22 is determined, in this embodiment, remote speed management application 64 executes to generate speed limit 18 based on the present geographic location, in the manner described above (Block 144). Once speed limit 18 is determined, in this embodiment, remote speed management application 64 may execute to transmit speed limit 18 across wireless network 46 to resident speed management module 14 to perform the operations described above (Block 146). Alternatively, remote speed management application 64 may include the logic enabling execution to generate alert 16 and/or speed control signal 28 in a similar manner as that described above with respect to resident speed management application 38 (Block 148, 150). In this case, remote speed management application 64 may then execute to forward alert 16 and/or speed control signal 28, including desired speed 30, across wireless network 46 to resident speed management module 14 (Block 152, 154). Upon receipt of this information, resident speed management module 14 may then operate as described above to transmit alert 16 to output mechanism 24 and/or to transmit speed control signal 28 to vehicle 34.

Figure 5:
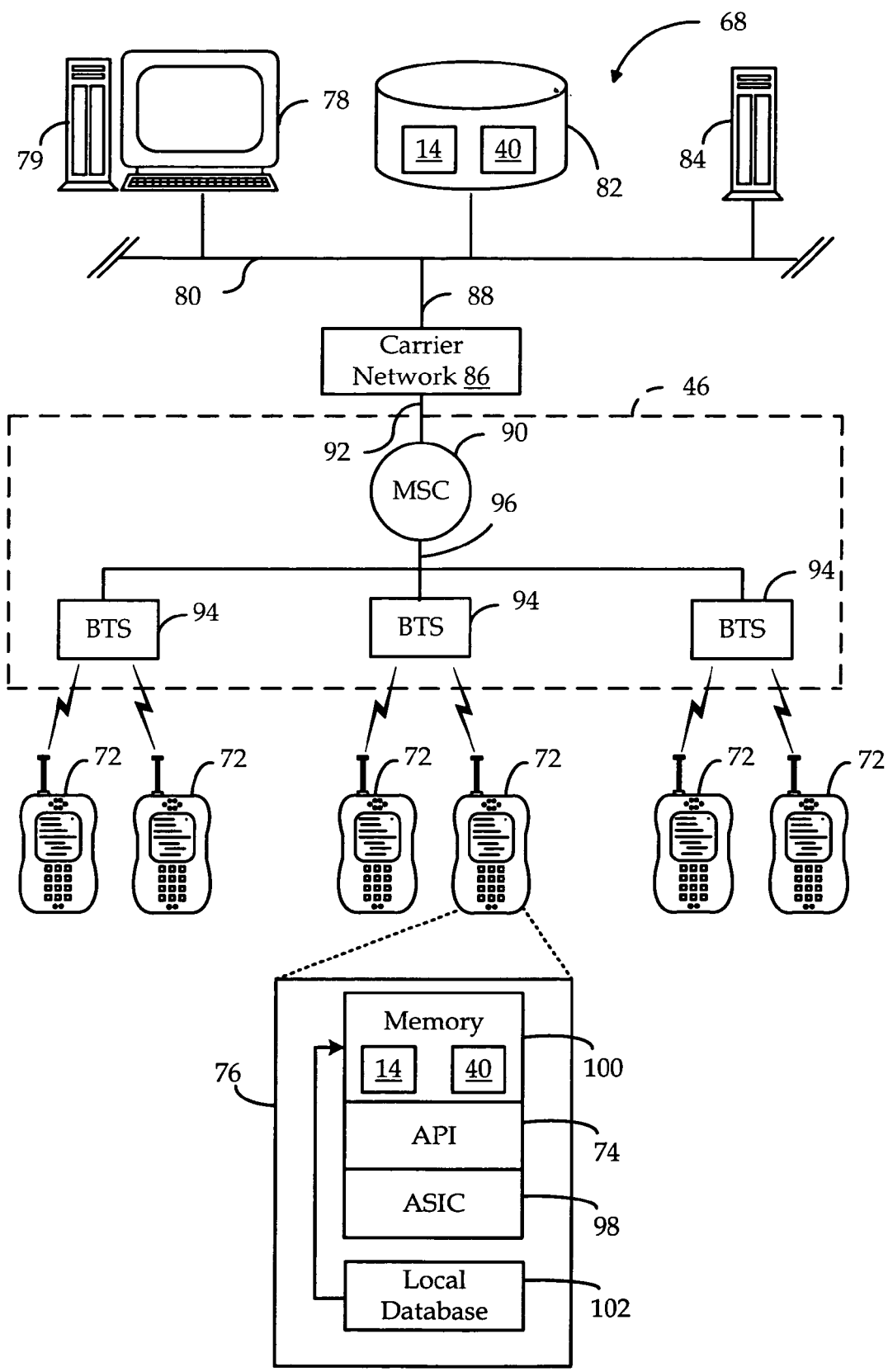
FIG. 5 is a schematic diagram of one embodiment of a cellular telephone network embodiment of the system of FIG. 1, including one embodiment of a computer platform of the wireless device of FIG. 1.

In an embodiment where wireless device 12 comprises a cellular telephone 72, for example referring to FIG. 5, system 10 (FIG. 1) may include wireless network 46 connected to a wired network 68 via a carrier network 86. The use of cellular telecommunication pathways has been increasing because wireless devices, such as the plurality of cellular telephones 72 illustrated in FIG. 5, are being manufactured with increased computing capabilities and are becoming tantamount to personal computers and hand-held personal digital assistants ("PDAs"), communicating packets including voice and data over wireless network 46. These "smart" cellular telephones 72 have installed application programming interfaces ("APIs") 74 onto their local computer platform 76 that allow software developers to create software applications that operate on the cellular telephone, and control certain functionality on the device. FIG. 5 is a representative diagram that more fully illustrates the components of a cellular wireless network and interrelation of the elements of one embodiment of the present system. The embodiment of FIG. 5 is merely exemplary and can include any system whereby remote modules, such as wireless devices 12, communicate over-the-air between and among each other and/or between and among components of a wireless network 46, including, without limitation, wireless network carriers and/or servers.

Wireless device 12, although described as cellular telephone 72 with reference to FIG. 5, can additionally include any other type of mobile or portable communications device, such as a personal digital assistant, a two-way text pager, a laptop computer and a tablet computer. Additionally, wireless device 12 can be a remote-slave, or other device that does not have an end-user thereof but simply communicates data across the wireless network 46. For example, wireless device 12 may include a remote sensor, a diagnostic tool, a data relay, and the like. The apparatus and method of speed management and control can accordingly be applied to any form of wireless communications device or module, including a wireless communication portal, a wireless modem, PCMCIA cards, access terminals, personal computers, telephones, asset tags, telemetry modules, or any combination or sub-combination thereof.

Referring back to the embodiment of FIG. 5, remote location module 44 and remote speed management module 62 (FIG. 1) may be executable instructions stored in and processed by a user manager/server 78 in communication over a LAN network 80 with other processing and storage network elements, such as a separate data repository 82. User manager 78 may be at least one of any type of server, personal computer, mini-mainframes and the like. User manager 78 may include associated components, such as input devices like a keyboard and mouse, output devices like a display and an audio speaker, and processing devices like a central processing unit. Additionally, user manager 78 may include logic, such as a user manager application 79, executable to communicate with wireless device 12 across network 46 to remotely download resident speed management module 14 and/or resident location module 40. Additionally, data repository 82 may store the data received from wireless device 12 and/or the data generated by modules 44 and 62, and may store resident speed management module 14 and/or resident location module 40 for downloading by user manager 78. Further, a data management server 84 may be in communication with user manager 78 to provide post-processing capabilities, data flow control, etc.

User manager 78, data repository 82 and data management server 84 may be present on the network, along with any other network components that are needed to provide cellular telecommunication services to cellular phones 72. For example, user manager 78 and/or data management server 84 communicate with a carrier network 86 through a data link 88, such as the Internet, a secure LAN, WAN, or other network. Carrier network 86 controls messages (generally being data packets) sent to a mobile switching center ("MSC") 90. Further, carrier network 86 communicates with MSC 90 by a network 92, such as the Internet, and/or POTS ("plain old telephone system"). Typically, in network 92, a network or Internet portion transfers data, and the POTS portion transfers voice information. MSC 90 may be connected to multiple base stations ("BTS") 94 by another network 96, such as a data network and/or Internet portion for data transfer and a POTS portion for voice information. BTS 94 ultimately broadcasts messages wirelessly to the wireless devices, such as cellular telephones 72, by short messaging service ("SMS"), or other over-the-air methods.

Further, computer platform 76 of each wireless device 12, such as a plurality of cellular telephones 72 in FIG. 2, is operable to execute logic for transmitting data across wireless network 46. Additionally, computer platform 76 is operable to execute logic to receive and execute software applications and display data transmitted from GPS 42, remote location module 44, remote speed management module 62, user manager 78 and any other computer device connected to wireless network 46. Computer platform 76 also includes an application-specific integrated circuit ("ASIC") 98, or other chipset, processor, microprocessor, logic circuit, or other data processing device. ASIC 98 may execute application programming interface ("API") layer 74 that interfaces with any resident programs, such as resident speed management module 14 and resident location module 40, in a memory 100 of wireless device 12, or cellular phones 72 in FIG. 2. API 74 is a runtime environment executing on the respective wireless device. One such runtime environment is Binary Runtime Environment for Wireless® (BREW®) software developed by Qualcomm, Inc., of San Diego, Calif. Other runtime environments may be utilized, for example, that operate to control the execution of applications on wireless computing devices. Computer platform 76 may also include memory 100, such as read-only and/or random-access memory (RAM and ROM), erasable programmable ROM (EPROM), electrically erasable programmable ROM (EEPROM), flash cards, and/or any memory common to computer platforms. Computer platform 76 also includes a local database 102 that can hold the software applications, files, or data not actively used in memory 100, such as the software applications or data downloaded from user manager 78. Local database 102 typically includes one or more flash memory cells, but can be any secondary or tertiary storage device, such as magnetic media, EPROM, EEPROM, optical media, tape, or soft or hard disk. Additionally, local database 102 can ultimately store a local copy of all and/or a portion of resident speed management module 14 and/or resident location module 40.

Referring back to FIG. 1, each of modules 14, 40, 44 and 62 may include one or a combination of hardware, software applications/programs, firmware, logic, and executable instructions operable to provide the functionality described herein. This functionality includes data processing, data exchange and data storage.

Vehicle 34 includes any type of moving device, including but not limited to an automobile, a truck, a motorcycle, a scooter, an airplane, a train, a boat, a helicopter, and a bicycle. Speed control system 32 of vehicle 34 may be any type of system operable to adjust a speed associated with vehicle 34, including but not limited to automatic systems like a cruise control system and an auto-pilot system and manual systems such as an accelerator associated with an engine, transmission and tires, and a manually-input motive force, such as a user apply force to the pedals of a bicycle. Correspondingly, transit route 20 may be a road, a waterway, a bike path, an air corridor, or any space or area designated for travel by a moving vehicle.

Geographic information system, as described above, may comprise one or a combination of orbiting systems and terrestrial-based systems, such as GPS 42 and remote location module 44. One example of such a geographic information system includes the QPoint™ Positioning Software and gpsOne® hybrid Assisted GPS wireless location technology available from Qualcomm, Inc., of San Diego, Calif. Geographic information system is not limited thereto, however, and includes any other system or tool used to gather, transform, manipulate, analyze, and produce information relating to the location/position of the respective wireless device. Additionally, referring to FIG. 1, geographic information system such as remote location module 44 may also store and transmit additional geographic information 104 to wireless device 12 based on present geographic position 22. Additional geographic information 104 may be displayable on output mechanism 24 of wireless device 12. For example, additional geographic information 104 includes, but is not limited to: geographic maps including representations of an area associated with present geographic position 22, and may further include identification of transit routes, commercial establishments, government buildings, historical sites, and other commercial and public points of interest, etc.

The systems and methods of the described embodiments may be implemented in a computer readable medium, such as a program or application that directs a computer device to perform the functions described above. Such a computer readable medium includes a primary memory of the computer device, as well as secondary and tertiary memories. Further, such a computer readable medium includes removable memory devices, such as a magnetic disk or tape, an optical disk, a hard disk, a flash memory, a memory card, a smartcard, or any other computer readable and/or writeable storage medium.

While the various disclosed embodiments have been illustrated and described, it will be clear that the subject matter of this document is not limited to these embodiments only. For example, control signal 28 may control other features on vehicle related to movement of the vehicle and/or route conditions, such as automatically turning on/off headlights when entering/leaving a tunnel. Numerous other modifications, changes, variations, substitutions and equivalents will be apparent to those skilled in the art without departing from the spirit and scope of the disclosed embodiments as described in the claims.

What is claimed is:

1. A method of speed management and control, comprising:
   receiving a present geographic position of a wireless device;
   determining a speed limit corresponding to the present geographic position;
   generating a speed control signal based on the speed limit;
   transmitting the speed control signal to a speed control system of a vehicle associated with the wireless device, wherein the speed control system is configured to control the actual speed of the vehicle based on the speed control signal; and
   receiving a verification from the speed control system of the vehicle relating to a change in the actual speed of the vehicle, wherein the change in the actual speed is in response to the speed control signal.

2. The method of claim 1, wherein the speed control signal is further based on a desired speed of a vehicle associated with the wireless device, wherein the desired speed is based upon the speed limit.

3. The method of claim 1, wherein the speed control signal comprises the speed limit, and the method further comprising causing an actual speed associated with the wireless device to have a predetermined relationship relative to the speed limit.

4. The method of claim 1, wherein receiving the present geographic position of the wireless device further comprises:
   exchanging wireless communications with a geographic information system; and
   determining the present geographic position based on the exchanged wireless communications.

5. The method of claim 1, wherein receiving the present geographic position of the wireless device further comprises receiving the present geographic position from a remote location module located across a wireless network.

6. The method of claim 1, wherein receiving the present geographic position of the wireless device further comprises calculating the present geographic position by the resident location module.

7. The method of claim 1, wherein determining the speed limit corresponding to the present geographic position further comprises:
   referencing a database having a plurality of geographic location data associated with a plurality of speed limit data;

matching the present geographic position with one of the plurality of geographic location data; and retrieving a corresponding one of the plurality of speed limit data.

8. The method of claim 1, wherein determining the speed limit corresponding to the present geographic position further comprises receiving the speed limit from a remote speed management module located across a wireless network.

9. The method of claim 1, further comprising selectively generating an alert based upon the speed limit, wherein the alert further comprises at least one of an indication of the speed limit, a warning that the speed limit has increased or decreased based on a comparison of the speed limit and a prior speed limit, an indication of an actual speed associated with the wireless device, an indication of a desired speed associated with the wireless device, a representation of a geographical area corresponding to the present geographical location, a representation of a transit route map corresponding to the present geographical location, a representation of a special road condition, a warning of special zoning, and a speed condition warning selected from the group consisting of the actual speed being above the speed limit, the actual speed being below the speed limit, the actual speed being about equal to the speed limit, the actual speed being within a predetermined range of the speed limit, and the actual speed being outside of the predetermined range of the speed limit.

10. The method of claim 9, wherein selectively generating the alert based upon the speed limit further comprises outputting the alert on an output mechanism of the wireless device in a manner selected from the group consisting of a continuous manner, a time-interval-based manner, and a predetermined event manner.

11. The method of claim 10, wherein the predetermined event comprises at least one of a change in the speed limit, a condition wherein an existing desired speed is outside of a predetermined range of the speed limit, a condition wherein an actual speed is outside of a predetermined range of the speed limit, and a detection of an input from an external entity.

12. The method of claim 11, wherein the external entity comprises an operator of a vehicle or a user of the wireless device.

13. A method of speed management and control, comprising:

determining a present geographic position of a wireless device;

referencing a database on the wireless device having a plurality of geographic location data associated with a plurality of speed limit data;

matching the present geographic position with one of the plurality of geographic location data;

identifying a speed limit as the one of the plurality of speed limit data corresponding to the matched one of the plurality of geographic location data;

generating a speed control signal based on the speed limit;

transmitting the speed control signal to a speed control system of a vehicle associated with the wireless device, wherein the speed control system is configured to control the actual speed of the vehicle based on the speed control signal; and receiving a verification from the speed control system of the vehicle relating to a change in the actual speed of the vehicle, wherein the change in the actual speed is in response to the speed control signal.

14. The method of claim 13, further comprising determining an actual speed of the wireless device, wherein the speed control signal is further based on the actual speed.

15. The method of claim 14, where determining the actual speed comprises one of determining the actual speed on the wireless device or receiving an input representing the actual speed from another device.

16. An apparatus for speed management and control, comprising:

a determination means for determining a present geographic position of a wireless device;

a referencing means for referencing a database on the wireless device having a plurality of geographic location data associated with a plurality of speed limit data;

a matching means for matching the present geographic location with one of the plurality of geographic location data;

an identification means for identifying a speed limit as the one of the plurality of speed limit data corresponding to the matched one of the plurality of geographic location data;

a generating means for generating a speed control signal based on the speed limit;

a transmitting means for transmitting the speed control signal to a speed control system of a vehicle associated with the wireless device, wherein the speed control system is configured to control the actual speed of the vehicle based on the speed control signal; and a receiving means for receiving a verification from the speed control system of the vehicle relating to a change in the actual speed of the vehicle, wherein the change in the actual speed is in response to the speed control signal.

17. A wireless device, comprising:

a computer platform; and a speed management module executable by the computer platform, the speed management module operable to:

receive a geographic position associated with the wireless device, determine a speed limit corresponding to the geographic position, generate a speed control signal based on the speed limit;

transmit the speed control signal to a speed control system of a vehicle associated with the wireless device, wherein the speed control system is configured to control the actual speed of the vehicle based on the speed control signal; and receive a verification from the speed control system of the vehicle relating to a change in the actual speed of the vehicle, wherein the change in the actual speed is in response to the speed control signal.

18. The device of claim 17, wherein the speed control signal is further based on a desired speed of a vehicle associated with the wireless device, wherein the desired speed is based upon the speed limit.

19. The device of claim 17, wherein the speed control signal comprises the speed limit, and wherein the speed management application is further operable to cause an actual speed associated with the wireless device to have a predetermined relationship relative to the speed limit.

20. The device of claim 17, further comprising a location module operable to transmit the geographic position to the speed management module.

21. The device of claim 20, wherein the location module is further operable to exchange communications across a wireless network with a location determination system or a remote location module to determine the geographic position.

22. The device of claim 20, wherein the location module is further operable to calculate the geographic position.

23. The device of claim 17, further comprising a database having a plurality of geographic location data associated with a plurality of speed limit data, and wherein the speed management module is further operable to reference the database, match the geographic position with one of the plurality of geographic location data, and retrieve a corresponding one of the plurality of speed limit data.

24. The device of claim 17, wherein determining the speed limit corresponding to the present geographic position further comprises receiving the speed limit from a remote speed management module located across a wireless network.

25. The device of claim 17, wherein the speed management module further operable to generate an alert based upon the speed limit, and wherein the alert further comprises at least one of an indication of the speed limit, a warning that the speed limit has increased or decreased based on a comparison of the speed limit and a prior speed limit, an indication of an actual speed associated with the wireless device, an indication of a desired speed associated with the wireless device, a representation of a geographical area corresponding to the present geographical location, a representation of a transit route map corresponding to the present geographical location, a representation of a special road condition, a warning of special zoning, and a speed condition warning selected from the group consisting of the actual speed being above the speed limit, the actual speed being below the speed limit, the actual speed being about equal to the speed limit, the actual speed being within a predetermined range of the speed limit, and the actual speed being outside of the predetermined range of the speed limit.

26. The device of claim 25, further comprising an output mechanism, and wherein the speed management module is further operable to output the alert on the output mechanism in a manner selected from the group consisting of a continuous manner, a time-interval-based manner, and a predetermined event manner.

27. The device of claim 26, wherein the predetermined event comprises at least one of a change in the speed limit, a condition where an existing desired speed is outside of a predetermined range of the speed limit, a condition where an actual speed is outside of a predetermined range of the speed limit, and a detection of an input from an external entity.

28. The device of claim 27, wherein the external entity comprises an operator of a vehicle or a user of the wireless device.

29. A computer-readable medium for speed management and control, comprising:
    at least one sequence of instructions, wherein execution of the instructions by a processor causes the processor to perform the actions of:
    determining a present geographic position of a wireless device;
    referencing a database on the wireless device having a plurality of geographic location data associated with a plurality of speed limit data;
    matching the present geographic position with one of the plurality of geographic location data;
    identifying a speed limit as the one of the plurality of speed limit data corresponding to the matched one of the plurality of geographic location data; and
    generating a speed control signal based on the speed limit;
    transmitting the speed control signal to a speed control system of a vehicle associated with the wireless device, wherein the speed control system is configured to control the actual speed of the vehicle based on the speed control signal; and
    receiving a verification from the speed control system of the vehicle relating to a change in the actual speed of the vehicle, wherein the change in the actual speed is in response to the speed control signal.

* * * * *

UNITED STATES PATENT AND TRADEMARK OFFICE
CERTIFICATE OF CORRECTION

| | |
|---|---|
| PATENT NO. | : 7,660,658 B2 |
| APPLICATION NO. | : 11/361221 |
| DATED | : February 9, 2010 |
| INVENTOR(S) | : Leonid Sheynblat |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 641 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,660,658 B2 | |
| APPLICATION NO. | : 11/361221 | |
| DATED | : February 9, 2010 | |
| INVENTOR(S) | : Sheynblat | |

It is certified that error appears in the above-identified patent and that said Letters Patent is hereby corrected as shown below:

Column 10, line 41, claim 2: "a vehicle" to read as --the vehicle--

Column 11, line 41, claim 12: "a vehicle" to read as --the vehicle--

Column 12, line 51, claim 18: "a vehicle" to read as --the vehicle--

Column 13, line 13, claim 25: "module further" to read as --module is further--

Column 14, line 8, claim 28: "a vehicle" to read as --the vehicle--

Signed and Sealed this
Twelfth Day of June, 2012

David J. Kappos
*Director of the United States Patent and Trademark Office*